July 23, 1968  W. A. LLOYD  3,394,385
MULTICHANNEL ELECTROGRAPHIC RECORDER EMPLOYING AN ARRAY
OF WRITING ELECTRODES ENERGIZED BY PLURAL
MOVING ELECTRICAL CONTACTORS
Filed Sept. 12, 1966  2 Sheets-Sheet 2
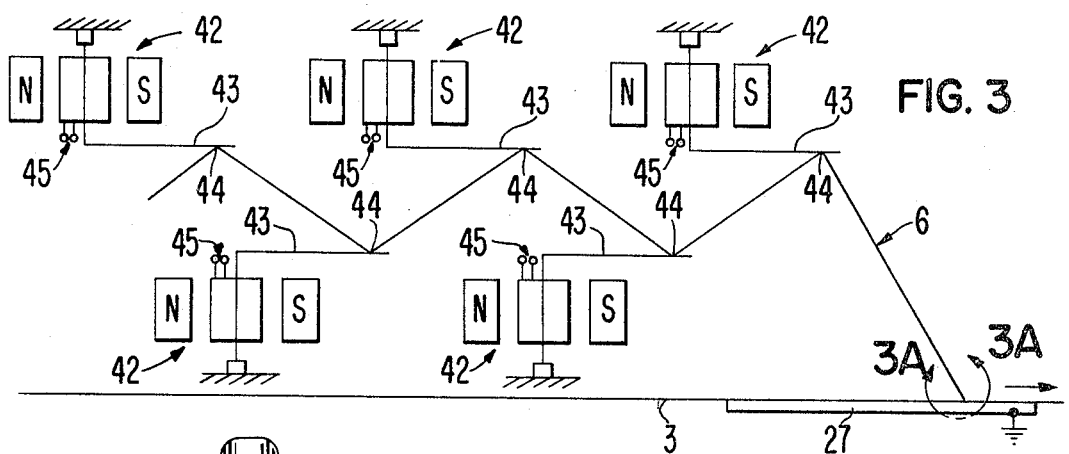
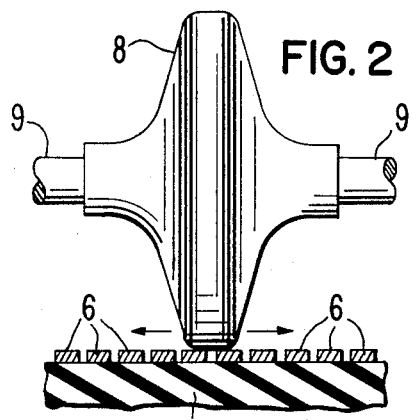
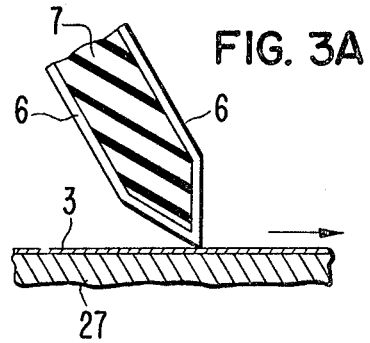
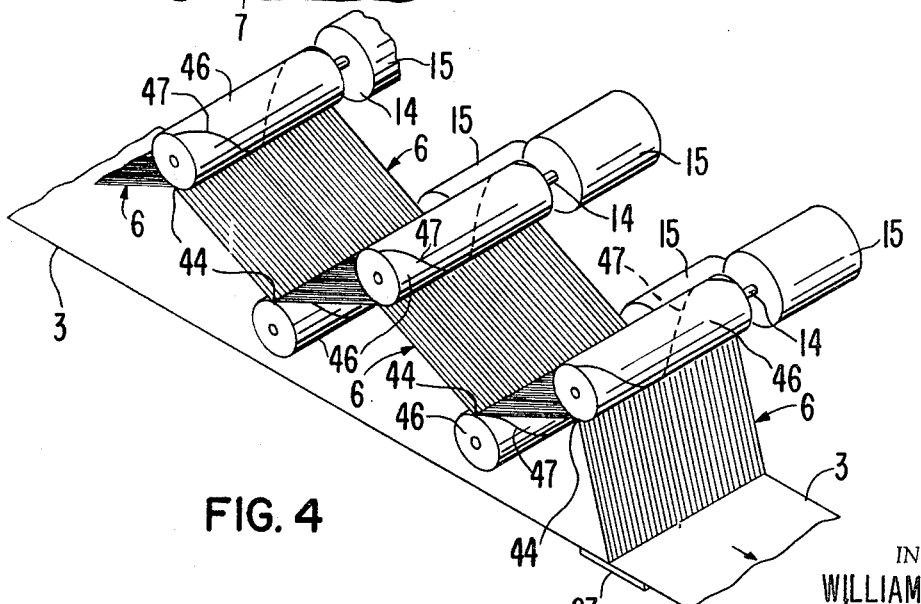
INVENTOR.
WILLIAM A. LLOYD
BY
ATTORNEY

United States Patent Office 3,394,385
Patented July 23, 1968

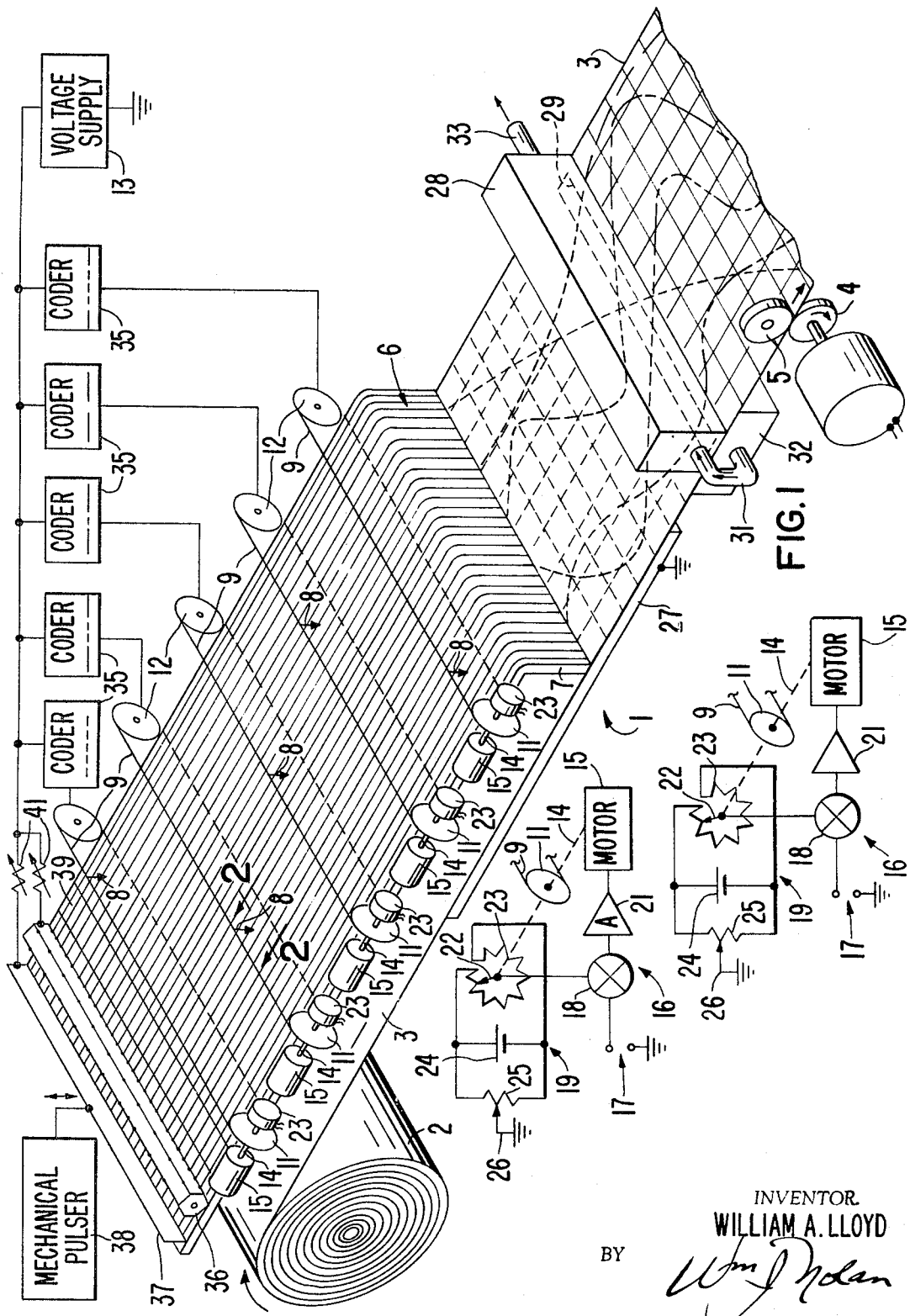

3,394,385
MULTICHANNEL ELECTROGRAPHIC RECORDER EMPLOYING AN ARRAY OF WRITING ELECTRODES ENERGIZED BY PLURAL MOVING ELECTRICAL CONTACTORS
William A. Lloyd, San Jose, Calif., assignor to Varian Associates, Palo Alto, Calif., a corporation of California
Filed Sept. 12, 1966, Ser. No. 578,542
7 Claims. (Cl. 346—49)

ABSTRACT OF THE DISCLOSURE

A multichannel electrographic recorder is disclosed. The electrographic recorder employs an array of writing electrodes laterally disposed of a moving recording web. The writing electrodes are elongated and extend away a considerable distance from the writing surface. A plurality of moving electrical contacts are each separately movable across the array of electrodes in response to the output of one of the channels of the recorder. In this manner, a number of different electrodes of the array of electrodes are simultaneously energized in accordance with the separate movements of the plural contactors operating in response to the separate input signals to be recorded. As a result, the recorder records the plural outputs of the plural channels of the recorder simultaneously on the same time scale on the moving recording web. The mechanism for causing each of the contactors to be moved across the array of writing electrodes may take any one of a number of different mechanical forms, such as, a closed loop cable and pulley drive, a galvanometer movement, or a rotatable cylinder being rotated in response to the input signal to be recorded, to cause the point of contact between the helical contactor and the array of electrodes to move to and fro across the array of electrodes.

---

Heretofore, electrographic recorders have been proposed which would simultaneously record a number of different signals on the same time scale. Such a recorder is described in U.S. Patent 2,501,791 issued Mar. 28, 1950. However, in this prior recorder the distributor means for applying the various different signal writing potentials to the array of writing electrodes comprised a relatively complex and expensive system of special Iconoscope and oscilloscope tubes.

In the present invention, the different signal writing potentials are simultaneously applied to the writing array by means of a plurality of separately movable electrical contactors which are each moved across the array of writing electrodes in response to the different input signals to be recorded in their separate respective channels. The movable contactors may be moved across the electrode array by any one of a number of simple and relatively inexpensive conventional mechanical devices including those commonly used in conventional pen type graphic recorders. For example, cable drives, galvanometer movements, and revolving drums having a helical contactor may be employed for moving the contacts which distribute the writing potentials to the array of signal writing electrodes.

The principal object of the present invention is the provision of an improved multichannel electrographic recorder.

One feature of the present invention is the provision, in an electrographic recorder employing an array of writing electrodes, of plural movable contactors each serving to distribute the separate writing potentials, representative of a signal to be recorded, to the array of writing electrodes, whereby conventional simple and relatively inexpensive means may be employed for recording the plural input signals on a common recording web and with a common time scale.

Another feature of the present invention is the same as the preceding feature wherein the movable contactors are moved across the array of electrodes by means of mechanical drives selected from the class of, cable drives, galvanometer movements, and rotatable drums having helical contactors formed thereon.

Another feature of the present invention is the same as any one or more of the preceding features wherein means are provided for modulating the separate writing potentials with different coded signals for distinguishing one recorded signal trace from another.

Another feature of the present invention is the same as any one or more of the preceding features wherein the writing electrodes are elongated conductors formed on a nonconductive circuit board, whereby the electrodes may be closely spaced and whereby ample space is provided for accommodation of the plural movable contactors.

Another feature of the present invention is the same as any one or more of the preceding features wherein the writing electrode array writes by depositing an electrostatic line charge image upon a dielectric surface of a moving recording web, whereby a relatively inexpensive recording medium may be employed.

Other features and advantages of the present invention will become apparent upon a perusal of the following specification taken in connection with the accompanying drawings wherein:

FIG. 1 is a schematic perspective view of a graphic recorder of the present invention, FIG. 2 is an enlarged fragmentary sectional view of a portion of the structure of FIG. 1 taken along line 2—2 in the direction of the arrows, FIG. 3 is a schematic longitudinal view of an alternative galvanometer type of writing electrode movement for the recorder of FIG. 1, FIG. 3A is an enlarged detail view of a portion of the structure of FIG. 3, and FIG. 4 is a schematic perspective view of an alternative rotatable drum with a helical writing electrode type of writing movement for the recorder of FIG. 1.

Referring now to FIG. 1 there is shown a multichannel electrographic recorder 1 embodying features of the present invention. The recorder 1 includes a supply roll 2 of recording web 3. The web 3 is pulled from the roll 2 by a variable speed, motor driven friction wheel 4 which frictionally pulls the web 3 between the friction wheel 4 and an idler wheel 5.

An array of electric writing electrodes 6 extends laterally of the web 3 intermediate the supply roll 2 and the friction drive wheel 4. The writing electrode array 6, in a preferred embodiment, comprises a dielectric printed circuit board 7 having a multitude of parallel conductors printed onto one surface to form the electrodes of the array 6. For example, the board 7 would have a width about equal to the width of the recording web 3, as of 5 inches. The individual conductors 6 would have a width of .008″ and a thickness of .004″ and would be spaced apart by .008″. In this manner each of the conductors 6 forms a separately energizable writing electrode. The board 7 may be straight or bent. In the illustrated embodiment, the board 7 is bent at right angles to parallel the web 3 to form a flatter overall recorder package profile.

A plurality of cable driven electrical contactors 8, as of hardened steel or tungsten carbide, (see FIG. 2) ride laterally to and fro across the elongated extension portion of the writing electrode array 6. The contactors 8 are each pulled to and fro by a closed loop cable drive 9. The cable 9 is preferably conductive, as of stranded stainless steel, and rides over a drive pulley 11 and an idler pulley 12. The drive pulley 11 is preferably made of an insulating material and the idler pulley 12 is preferably made of a conductive material to which is applied the writing potential, as of −300 v. to −1000 v., as derived from a source of writing potential 13.

The drive pulleys 11 are coupled to the output shafts 14 of reversible motors 15. The motors 15 are the servomotors 15 of self balancing potentiometric recorder circuits 16 to which are applied the signals to be recorded. Only two of such circuits 16 are depicted in FIG. 1 for the sake of simplicity of explanation.

The plural separate recorder circuits 16 each comprise a pair of input terminals 17 to which are applied the signals to be recorded. The input signal is fed from the terminals 17 to an error detector circuit 18 which compares the input signal against a reference potential derived from a potentiometer circuit 19 to obtain an error signal which is fed to amplifier 21. The output of amplifier 21 is fed to the input of the reversible servo-motor 15. The output shaft 14 of the servo-motor 15 is coupled to the drive pulley 11 and to a pickoff 22 of a potentiometer 23 in the potentiometer circuit 19. The pickoff 22 picks off the reference voltage which is applied to error detector 18. When the reference voltage balances out the input signal voltage in the error detector 18 the error signal is of zero amplitude and the recorder circuit 16 is in a condition of null balance. Thus, the cable drives 9 with their affixed contactors simultaneously track to and fro across the array of writing electrodes in variable accordance with changes in the amplitude of their respective input signals.

The potentiometer circuits 19 each include a voltage source 24 parallel connected to the reference potentiometer 23 and a second potentiometer 25. The pickoff 26 of the second potentiometer is grounded to form the zero reference potential for the recorder circuit 16.

The electrode array 6 writes on the recorder web 3 by certain of the electrodes 6 being simultaneously selectively energized with writing potential by plural movable contactors 8. The writing potential is applied to the recorder web 3 across the space between the ends of the electrodes 6 and a grounded plate electrode 27 disposed on the opposite side of the web 3 from the electrodes 6. At least two types of recording web 3 may be used.

A first type of recording web is an electrosensitive paper. In this case, the writing potential causes a current to flow into the web. In a first kind of electrosensitive web the localized current produces an electrolysis action in chemically treated paper web to cause a contrasting discoloration, thus, producing a visible image. A second kind of electrosensitive web includes a thin sheet of metallic conductor such as aluminum foil onto which is formed an opaque coating which is color contrasting with the foil. The localized current flowing into the web causes the opaque coating to be burned away to expose the underlying contrasting foil.

A second type of recording web is an electrostatic paper. In this case, the web 3 is formed by a slightly conductive paper backing having a dielectric film writing surface which is positioned adjacent the electrodes 6. The writing potential, which is applied across the paper and film, causes a charge image to be deposited in the dielectric film. This charge image is subsequently developed (inked) by applying finely divided pigment particles to the image. The particles are in a colloidal suspension of dielectric fluid such as air or liquid solvent. As such, the pigment particles carry a charge which depends upon the method of preparing the suspension. The particles are chosen to carry an opposite charge to that of the charge image. Thus, the particles are electrostatically bound to only the charge image portions of the web 3. The image is subsequently fixed by applying heat in case of air suspension and by merely drying the web in the case of liquid suspension.

In a preferred embodiment of the present invention, electrostatic paper is used and this is developed by applying a liquid toner. A suitable paper is marketed by Crown Zellerbach and by Plastic Coating Corp. A suitable liquid toner is a mixture of 2–4% toner concentrate, marketed by Philip A. Hunt Co., in Shell Chemical Corp. No. 72 solvent.

In the case of liquid developer, a hollow channel member 28 is positioned laterally of the web 3 to receive the web 3 after the charge images have been deposited. An inking slot 29 is cut through the bottom wall of the channel 28. The slot 29 extends the full width of that portion of the web 3 to be developed. Ink (developer), previously described, is fed into one end of the channel 28 from a tube 31 which is connected into the bottom of an ink reservoir 32. The suction side of a pump, not shown, is connected via tubulation 33 to the other end of the channel 28. The pressure side of the pump may return the unused ink to the reservoir 32. The suction applied to the ink in the inking channel 28 causes the imaged side of the web 3 to be pushed by atmospheric pressure up against the slot 29 and into contact with the inking liquid. The marginal edges of the inking slot 29 serve to squeegee excess ink from the web 3. The inked images are sharp and distinct visible graphic displays of the various signals being recorded by the various plural channels of the recorder.

To distinguish one recorded signal trace from another, coders 35 are connected between the writing potential supply 13 and the various different contactors 8. The coders 35 merely modulate the various writing potentials with a different pulse code, i.e., all dots, dash-dot, all dashes, etc. A convenient method for coding the writing potentials is to have different code wheels driven off the same shaft as the motor driven friction wheel 4. The code wheels would each be electrically isolated from each other and comprise a rim portion made up of alternating conductive and insulating segments. Contact would be made to the rim by a brush assembly. The writing potential, as fed through the code wheel and brush assembly, would be modulated according to the rim segment pattern. A similar coding arrangement is described in U.S. Patent 2,501,791, above cited.

The electrode array 6 can also be used to print the chart grid pattern of amplitude and time scale indices. More specifically, the amplitude scale indices, the laterally spaced longitudinally directed lines on the recording web 3, are printed by means of an amplitude scale electrode 36 which extends laterally across the electrode array 6. The scale electrode 36 comprises a conductive member, hexagonal in transverse section. The ridge like apexes of the hexagonal member 36 each include a different array of laterally spaced protrusions. These protrusions correspond to different laterally spaced lines defining the amplitude scale indices of the recorded chart. The protrusions engage only certain ones of the electrodes 6 for applying the writing potential to only these certain ones of the electrodes 6. A different scale is provided on each one of the different 6 ridges of the scale writing electrode 36. Different scales are selected by rotating a different ridge of the electrode 36 into engagement with the electrode array 6.

Time scale indices of the recorded chart are also printed by the electrode array 6. A time scale electrode 37 in the form of a laterally directed conductive bar extends across the electrode array 6. The bar 37 is pulsed into and out of contact with all the electrodes 6 of the array by means of a mechanical pulser 38, such as for example, a spring biased iron core relay solenoid. The mechanical pulses of the pulser 38 are timed by an internal timer and the timing is preferably variable to provide any predetermined time separation between time scale indices on the recorded web 3. The electrodes 6, between the coductors 8 and the scale printing electrodes 36 and 37, preferably include a lossy section 39. This section prevents the full signal writing potential from being applied to the electrodes when used for scale writing. Thus, the printed chart scale indices may be subdued relative to the intensity of the recorded signal traces. Variable resistances 41 are also provided between the writing potential source and the scale writing electrodes 36 and 37 for further control of the intensity of the chart scale indices. As an alternative, a second lateral array of writing electrodes, not shown, closely spaced to the first array 6, could be employed for writing the chart scale indices.

Referring now to FIG. 3 there is shown an alternative embodiment of the present invention. In this embodiment, the null balance servo-motor driven potentiometer circuits are replaced by galvanometers 42. The pointer electrode 43 of the galvanometer is operated at the writing potential and it rides laterally to and fro in an arc over laterally directed ridge portions 44 of the elongated portions of the writing electrode array 6. In this case, the underlying circuit board 7 is corrugated to provide the ridges 44 and in addition has an array of conductors 6 printed on both sides of the board 7. The writing tips of the same writing electrodes 6, on opposite sides of the circuit board 7, are brought together at the tips as shown in the detail of FIG. 3A. Input signals to be recorded by the galvanometers 42 are applied thereto via terminals 45.

Referring now to FIG. 4 there is shown an alternative embodiment of the present invention. In this embodiment, the cable driven contactors 8 of FIG. 1 are replaced by dielectric rotatable cylinders 46 laterally extending of the ridges 44 of the corrugated electrode array 6, as described with regard to FIGS. 3 and 3A. A thin helically shaped conductive writing electrode 47 forms a raised ridge portion on the surface of the cylinder 46. The signal writing potential is applied to the helical electrode 47. Each of the cylinders 46 is coupled to a respective output shaft 14 of one of the null balance potentiometer recorder circuits 16, as previously described with regard to FIG. 1. As the cylinder 46 turns forward and backward in response to the changes in the input signal to be recorded, the point at which the helix 47 makes contact with the ridge 44 and, thus, a selected one of the electrodes 6, moves to and fro laterally across the array 6, thereby producing a graphic display of the signal being recorded on the web 3.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an electrographic recorder apparatus, means forming a plurality of input terminals to which is applied, in use, a plurality of separate signals to be recorded, means forming an array of separate writing electrodes laterally directed of a movable electrographic recording web, means forming a source of electrical writing potential, means forming plural separately movable contactors disposed over said common array of electrodes, the improvement comprising, means for moving said plural contactors laterally of said common array of electrodes with each contactor being moved separately across said common array of electrodes in response to its separate input signal to be recorded for selectively and simultaneously applying the writing potential to plural corresponding lateral positions on the recording web in accordance with the separate simultaneous lateral movements of each one of said movable contactors, whereby separate plural signal traces are simultaneously written on the recording web.

2. The apparatus of claim 1 wherein said writing electrodes of said array are separately energizable, and said movable contactors are electrical contactors for selectively applying the writing potential from said source of writing potential to certain ones of said separately energizable writing electrodes as selected by said contactors.

3. The apparatus of claim 2 including means for separately modulating the writing potentials as applied to said writing electrodes by said separate contactors with different coded signals, whereby the different recorded signals can be identified by their differently coded recorded traces.

4. The apparatus of claim 2 including means forming an electrically insulating substrate having elongated conductive portions of said writing electrode array overlying said substrate in contiguous abutting relation therewith for rigidly holding the elongated portions of said writing electrodes in fixed position relative to each other, and said electrical contactors disposed to ride laterally to and fro over said elongated portions of said writing electrode array in the regions thereof directly supported by said substrate.

5. The apparatus of claim 2 including, means forming a supply of recording web, means for pulling said recording web from said supply past said array of writing electrodes to form a multiple channel strip chart recording of the input signals.

6. The apparatus of claim 5 wherein said recording web is a conductive paper having a dielectric film on one side thereof to define the writing surface of said recording web, and wherein said writing electrodes write by depositing a line charge image on said dielectric film surface of said paper, and means for applying pigment particles to said charge image for developing visible traces of the recorded signals.

7. The apparatus of claim 5 wherein said recording web is an electrosensitive material, and wherein said writing electrodes write by passing a localized current into said electrosensitive web to produce a localized contrasting discoloration forming the recorded signal traces.

References Cited
UNITED STATES PATENTS

| | | | |
|---|---|---|---|
| 907,235 | 12/1908 | Herrick | 346—35 |
| 2,501,791 | 3/1950 | Silverman | 346—33 |
| 2,610,102 | 9/1952 | Gitzendanner | 346—49 |
| 3,286,272 | 11/1966 | Deg et al. | 346—50 |

FOREIGN PATENTS

| | | |
|---|---|---|
| 689,998 | 7/1964 | Canada. |

RICHARD B. WILKINSON, *Primary Examiner.*

E. C. SIMMONS, *Assistant Examiner.*